United States Patent
Berndt et al.

(10) Patent No.: US 8,578,745 B2
(45) Date of Patent: Nov. 12, 2013

(54) PEENING DEVICE

(75) Inventors: Thomas Berndt, Berlin (DE); Helge Reymann, Briarcliff Manor, NY (US)

(73) Assignee: Siemens Aktiengesellschaft, München (DE)

( * ) Notice: Subject to any disclaimer, the term of this patent is extended or adjusted under 35 U.S.C. 154(b) by 998 days.

(21) Appl. No.: 12/227,739

(22) PCT Filed: Apr. 13, 2007

(86) PCT No.: PCT/EP2007/053628
§ 371 (c)(1),
(2), (4) Date: Feb. 18, 2009

(87) PCT Pub. No.: WO2007/137902
PCT Pub. Date: Dec. 6, 2007

(65) Prior Publication Data
US 2009/0165519 A1    Jul. 2, 2009

(30) Foreign Application Priority Data

May 26, 2006    (EP) .................................... 06010927

(51) Int. Cl.
*C21D 7/06* (2006.01)
*B21C 37/30* (2006.01)
*B24B 39/00* (2006.01)

(52) U.S. Cl.
USPC ............................................... 72/53; 29/90.7

(58) Field of Classification Search
USPC .............................. 72/53; 29/90.7; 451/39–40
See application file for complete search history.

(56) References Cited

U.S. PATENT DOCUMENTS

| 4,530,861 | A | 7/1985 | Sippel |
| 6,189,356 | B1 * | 2/2001 | Simeone et al. .................. 72/53 |
| 6,490,899 | B2 * | 12/2002 | Berthelet et al. .................. 72/53 |
| 6,536,109 | B2 * | 3/2003 | Berthelet et al. ............... 29/90.7 |
| 6,732,424 | B2 * | 5/2004 | Nadicksbernd ................. 29/722 |
| 7,066,799 | B2 * | 6/2006 | Oussaada et al. ............. 451/439 |
| 7,596,978 | B2 * | 10/2009 | Hoelzel et al. .................... 72/53 |
| 7,992,416 | B2 * | 8/2011 | Stonitsch et al. ................. 72/53 |
| 2006/0021410 | A1 | 2/2006 | Cheppe |

FOREIGN PATENT DOCUMENTS

| DE | 19614555 A1 | 10/1997 |
| EP | 1207013 A1 | 5/2002 |
| EP | 1208942 A1 | 5/2002 |
| EP | 1621288 A2 | 2/2006 |
| RU | 2043910 C1 | 9/1995 |
| SU | 918071 B | 4/1982 |
| SU | 1155435 A | 5/1985 |

* cited by examiner

*Primary Examiner* — Dana Ross
*Assistant Examiner* — Mohammad I Yusuf

(57) ABSTRACT

The invention relates to a peening device for peening a component with a part to be peened and a part not to be peened. The peening device comprises a chamber with at least one opening located therein, wherein the opening is dimensioned in such a manner that the part not to be peened of the component can be guided there through, and a fixture for retaining the component which features a section which entirely covers the opening of the chamber when the part not to be peened is at least partially guided into said opening, and said section completely encloses the part not to be peened of the component between the adjacent region of the part to be peened of the component and the opening.

11 Claims, 5 Drawing Sheets

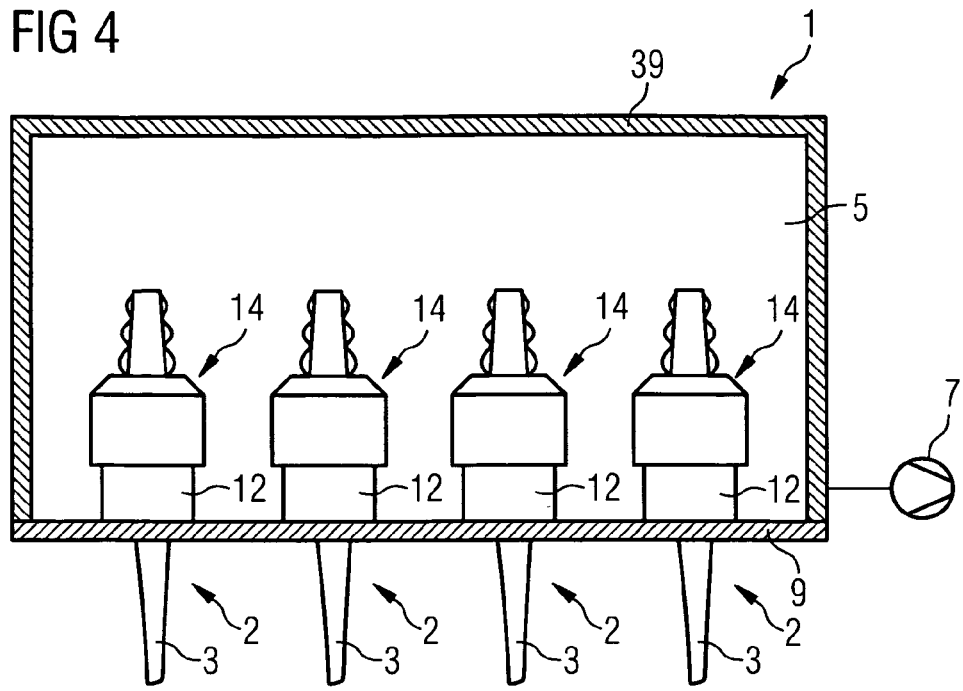
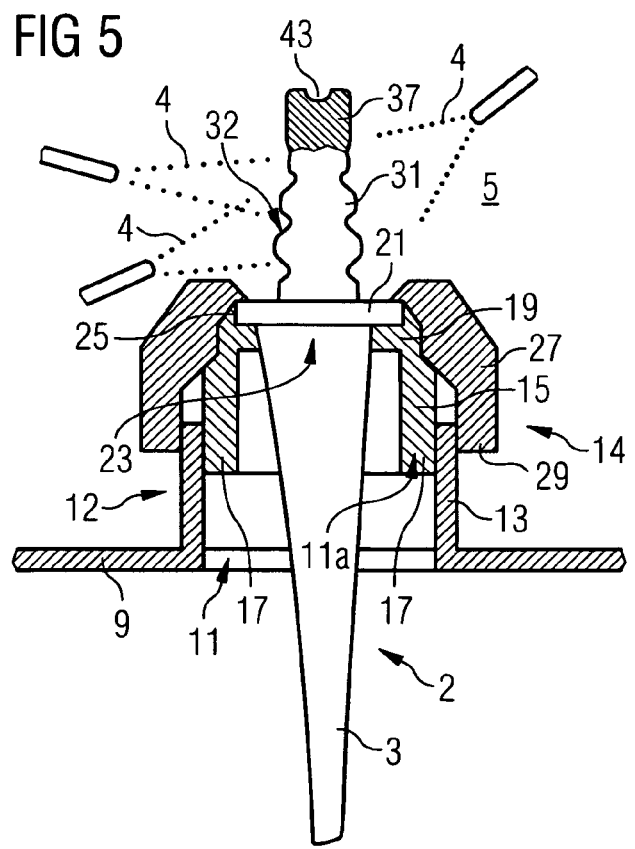

PEENING DEVICE

CROSS REFERENCE TO RELATED APPLICATIONS

This application is the US National Stage of International Application No. PCT/EP2007/053628, filed Apr. 13, 2007 and claims the benefit thereof. The International Application claims the benefits of European application No. 06010927.9 filed May 26, 2006, both of the applications are incorporated by reference herein in their entirety.

FIELD OF INVENTION

The present invention relates to a peening device for peening a component having a part to be peened and a part not to be peened.

BACKGROUND OF THE INVENTION

In a peening method, a peening product is thrown at high velocity against that surface of a component which is to be treated, the work outcome to be achieved being obtained. One example of a peening process is shot peening which is a special instance of strain hardening peening. In shot peening, small balls are thrown by means of spinner, compressed air or injector peening plants onto the surface to be treated. The impingement of the peening product at high velocity results in an elastoplastic deformation in the region of the surface, this giving rise to internal compressive stresses in the workpiece which lead to strain hardening in the region of the surface of the peened component portion. Another example of a peening process is sandblasting, in which, for example, corundum grains are thrown onto the surface to be treated, in order to strip off or roughen up surface regions.

When only specific regions of a component are to be peened, as a rule, the regions not to be peened are protected by means of a masking. Thus, for example, it is customary, in the case of turbine blades which have a blade foot, a blade leaf and a blade platform arranged between the blade foot and the blade leaf, to subject the blade foot and that side of the blade platform which faces the blade foot to a shot peening process in order to increase their strength. The remaining sides of the blade platform and also the blade leaf in this case are not subjected to the shot peening process, since this would lead to an impairment of the high-temperature properties. The masking of those parts of the turbine blade which are not to be subjected to the shot peening process is carried out by hand and is therefore labor and cost intensive.

SUMMARY OF INVENTION

The object of the present invention is to provide a peening device which allows a less labor and cost intensive preparation of components which have portions to be peened and not to be peened.

This object is achieved by means of a peening device as claimed in the claims. The dependent claims contain advantageous refinements of the peening device according to the invention.

A peening device according to the invention for peening a component having a part to be peened and a part not to be peened comprises a chamber with at least one orifice arranged in it, the orifice being dimensioned in such a way that that part of the component which is not to be peened can be led at least partially through it. Moreover, a mounting for holding the component is present. This mounting has a portion which, when that part of the component which is not to be peened is led at least partially through, completely covers the orifice in the chamber and completely surrounds that part of the component which is not to be peened between that region adjacent to that part of the component which is to be peened and the orifice.

The component inserted into the mounting can then be arranged in the chamber in such a way that the part not to be peened is for the most part located outside the chamber so as to be inaccessible to the peening product. In this case, the part not to be peened is protected, where it projects into the chamber, by the mounting which completely surrounds the part which projects into the chamber and is not to be peened. A complicated masking of that part of the component which is not to be peened may be dispensed with.

Advantageously, the chamber has a chamber bottom in which the at least one orifice is arranged.

In this refinement, that part of the component which is not to be peened can be led in the vertical direction through the orifice. Shot peening can then take place from the side of the component, and the peening product can flow off from the component and the mounting toward the chamber bottom, so that the outlets for the peening product are not blocked by peening product.

The peening device may be configured, in particular, as a peening device for peening a part of a turbine blade with a blade leaf, with a blade foot and with a blade platform arranged between the blade leaf and the blade foot. That part of the component which is to be peened is then formed by the blade foot and by that side of the blade platform which faces the blade foot. That part of the component which is not to be peened is then formed by the blade leaf and by those sides of the blade platform which do not face the blade foot. In this refinement, the dimensions of the orifice in the chamber are selected in such a way that the blade leaf can be led at least partially through the orifice. Moreover, the mounting is configured in such a way that it completely surrounds the turbine blade at least in the region of the edge of the blade platform. In comparison with a peening device according to the prior art, the turbine blade can be peened at a lower outlay in terms of labor and of costs by means of the device according to the invention, since the masking of the entire blade leaf and of a large part of the blade platform is dispensed with. By contrast, the insertion of the turbine blade into the mounting and the closing of the orifice by means of the mounting are very much less labor and cost intensive. Moreover, the material consumption is lower, since, in contrast to masking, no material which could not be reused is employed.

Moreover, the mounting may have a region on which that side of the blade platform which faces the blade leaf lies when the blade is held. Thus, the turbine blade can be supported by the mounting, particularly when the orifice is arranged in the chamber bottom, so that a reliable support of the turbine blade and consequently a reliable positioning can be achieved without further aids.

In an advantageous refinement of the peening device, the orifice may be surrounded by a margin projecting toward the chamber interior. What may be achieved by this refinement is that the blade foot is at such a great distance from the wall or the bottom of the chamber that the directions from which the peening product can reach the blade foot are not appreciably restricted by the near wall or the near bottom.

The mounting may additionally comprise a cap, which is designed to be placed onto that end of the blade foot which faces away from the blade leaf. By means of the cap, any inlet orifices, arranged in the blade foot, of cooling air ducts can be protected against the penetration of peening product. The cap can be connected or connectable to the mounting, particularly in such a way that, with the turbine blade held by the mounting, the connection is located at a distance from the blade foot in the region of the narrow sides of the blade foot. A highly stable arrangement of the cap can thus be achieved, without the accessibility of the blade foot for the peening product being appreciably restricted.

For the prevention of peening product deposits which in the course of the peening process could impair the free access of the peening product to the surface to be peened, the mounting may have discharge surfaces and/or discharge ducts for discharging the peening product. In particular, when the orifice is arranged in the chamber bottom, a rapid discharge of the peening product in the direction of the chamber bottom can thereby be brought about, utilizing the force of gravity.

The chamber is advantageously designed as a vacuum chamber, so that, on the one hand, the peening process is not impaired by air in the chamber and, on the other hand, an escape of peening product from the chamber in the event of a leakage point can be counteracted.

The peening device according to the invention may, in particular, be designed as a peening device for carrying out a shot peening process, that is to say as a shot peening device.

BRIEF DESCRIPTION OF THE DRAWINGS

Further features, properties and advantages of the present invention may be gathered from the following description of an exemplary embodiment, with reference to the accompanying figures.

FIG. 4 shows diagrammatically a peening device according to the invention in a sectional side view.

FIG. 5 shows a detail from FIG. 4 in a sectional side view.

FIG. 1 shows by way of example a gas turbine 100 in a longitudinal part section.

DETAILED DESCRIPTION OF INVENTION

Figure 1:
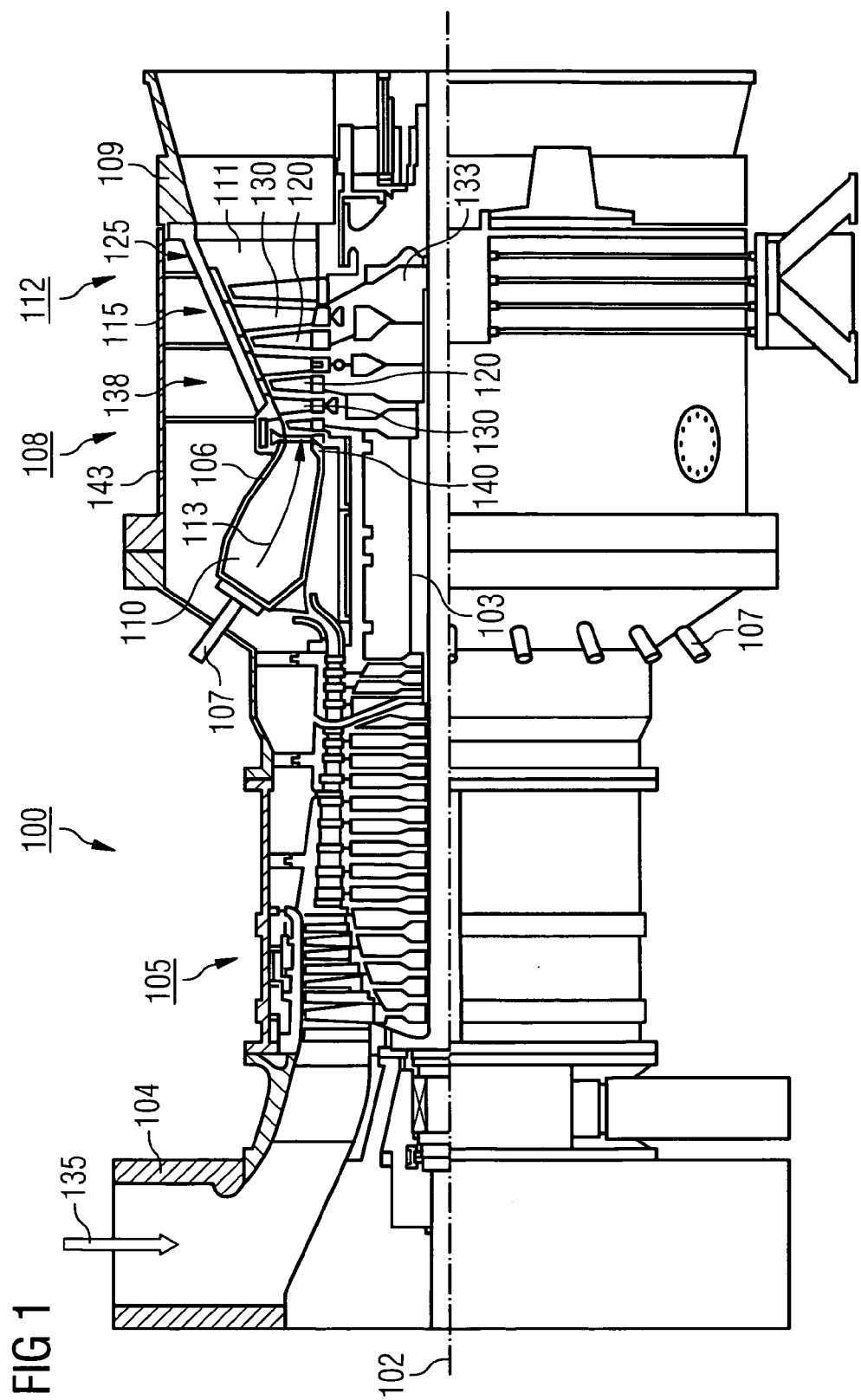
FIG. 1 shows by way of example a gas turbine in a longitudinal part section.

The gas turbine 100 has inside it a rotor 103 rotary-mounted about an axis of rotation 102 and having a shaft 101, said rotor also being designated as a turbine rotor.

An intake casing 104, a compressor 105, a, for example, toroidal combustion chamber 110, in particular annular combustion chamber, with a plurality of coaxially arranged burners 107, a turbine 108 and the exhaust gas casing 109 succeed one another along the rotor 103.

The annular combustion chamber 110 communicates with a, for example, annular hot-gas duct 111. There, for example, four turbine stages 112 connected in series form the turbine 108.

Each turbine stage 112 is formed, for example, from two blade rings. As seen in the direction of flow of a working medium 113, a guide blade row 115 is followed in the hot-gas duct 111 by a row 125 formed from moving blades 120.

The guide blades 130 are in this case fastened to an inner casing 138 of a stator 143, whereas the moving blades 120 of a row 125 are attached to the rotor 103, for example, by means of a turbine disk 133.

A generator or a working machine (not illustrated) is coupled to the rotor 103.

When the gas turbine 100 is in operation, air 135 is sucked in by the compressor 105 through the intake casing 104 and is compressed. The compressed air provided at the turbine-side end of the compressor 105 is routed to the burners 107 and mixed there with a fuel. The mixture is then burnt in the combustion chamber 110 so as to form the working medium 113. The working medium 113 flows from there along the hot-gas duct 111 past the guide blades 130 and the moving blades 120. At the moving blades 120, the working medium 113 expands so as to transmit a pulse, so that the moving blades 120 drive the rotor 103 and the latter drives the working machine coupled to it.

The components exposed to the hot working medium 113 undergo thermal loads while the gas turbine 100 is in operation. The guide blades 130 and moving blades 120 of the first turbine stage 112, as seen in the direction of flow of the working medium 113, are subjected to the highest thermal load, in addition to the heat shield elements lining the annular combustion chamber 110.

In order to withstand the temperatures prevailing there, these may be cooled by means of a coolant.

Substrates of the components may also have a directional structure, that is to say they are monocrystalline (SX structure) or have only longitudinally directed grains (DS structure).

Materials used for the components, particularly for the turbine blade 120, 130 and components of the combustion chamber 110, are, for example, iron-, nickel- or cobalt-based superalloys.

Such superalloys are known, for example, from EP 1 204 776 B1, EP 1 306 454, EP 1 319 729 A1, WO 99/67435 or WO 00/44949; these publications are part of the disclosure with regard to the chemical composition of the alloys.

The blades 120, 130 may also have coatings against corrosion (MCrAlX; M is at least one element of the group iron (Fe), cobalt (Co), nickel (Ni), X is an active element and stands for yttrium (Y) and/or silicon, scandium (Sc) and/or at least one rare earth element or hafnium). Such alloys are known from EP 0 486 489 B1, EP 0 786 017 B1, EP 0 412 397 B1 or EP 1 306 454 A1 which are to be part of this disclosure with regard to the chemical composition.

A heat insulation layer may also be present on the MCrAlX and consists, for example, of $ZrO_2$, $Y_2O_3$—$ZrO_2$, that is to say it is not stabilized or is partially or completely stabilized by yttrium oxide and/or calcium oxide and/or magnesium oxide.

Columnar grains are generated in the heat insulation layer by means of suitable coating methods, such as, for example, electron beam evaporation (EB-PVD).

The guide blade 130 has a guide blade foot (not illustrated here), facing the inner casing 138 of the turbine 108, and a guide blade head lying opposite the guide blade foot. The guide blade head faces the rotor 103 and is secured to a fastening ring 140 of the stator 143.

Figure 2:
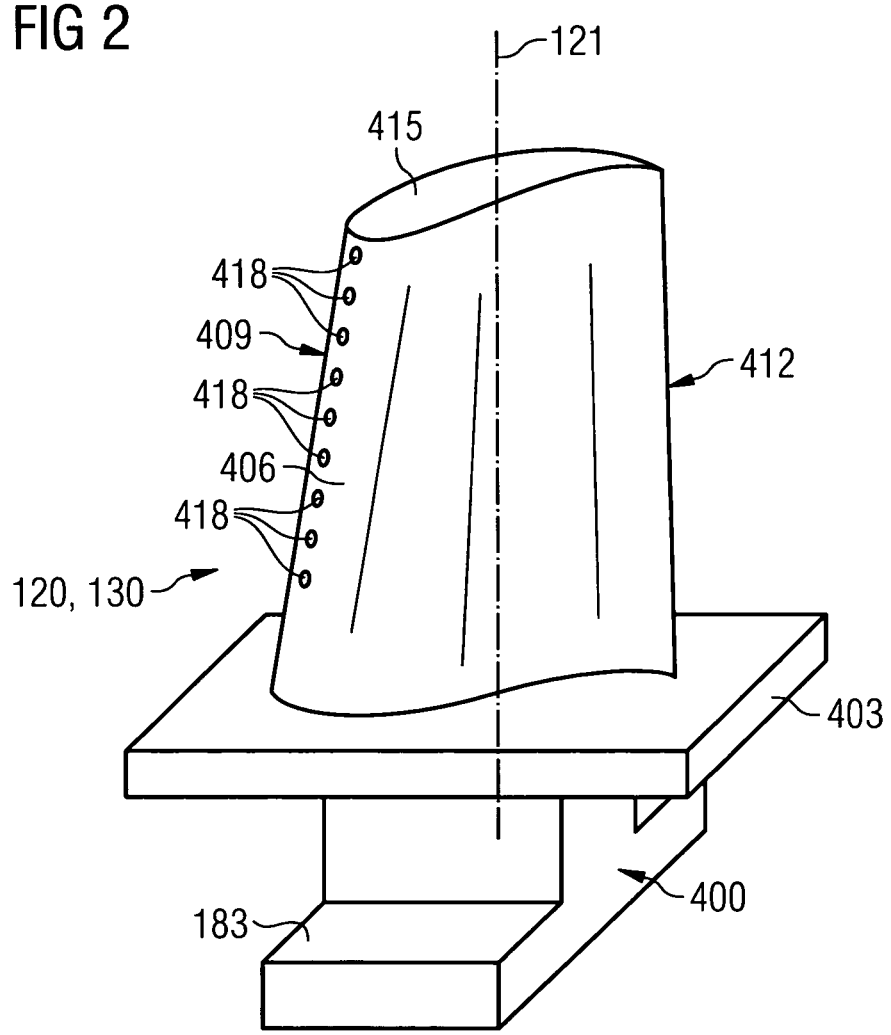
FIG. 2 shows a perspective view of a moving blade or guide blade of a turbomachine.

FIG. 2 shows a perspective view of a moving blade 120 or guide blade 130 of a turbomachine, said blade extending along a longitudinal axis 121.

The turbomachine may be a gas turbine of an aircraft or of a power station for electricity generation, a steam turbine or a compressor.

The blade 120, 130 has successively along the longitudinal axis 121 a fastening region 400, a blade platform 403 adjacent thereto and also a blade leaf 406 and a blade tip 415.

As a guide blade 130, the blade 130 may have a further platform at its blade tip 415 (not illustrated).

In the fastening region 400, a blade foot 183 is formed which serves for fastening the moving blades 120, 130 to a shaft or a disk (not illustrated).

The blade foot 183 is configured, for example, as a hammer head. Other configurations as a pinetree or dovetail foot are possible.

The blade 120, 130 has a leading edge 409 and a trailing edge 412 for a medium which flows past the blade leaf 406.

In conventional blades 120, 130, for example, solid metallic materials, in particular superalloys, are used in all regions 400, 403, 406 of the blade 120, 130.

Such superalloys are known, for example, from EP 1 204 776 B1, EP 1 306 454, EP 1 319 729 A1, WO 99/67435 or WO 00/44949; these publications are part of the disclosure with regard to the chemical composition of the alloy.

The blade 120, 130 may in this case be manufactured by means of a casting method, also by means of directional solidification, by means of a forging method, by means of a milling method or combinations thereof.

Workpieces with a monocrystalline structure or structures are used as components for machines which are exposed during operation to high mechanical, thermal and/or chemical loads.

The manufacture of monocrystalline workpieces of this type takes place, for example, by directional solidification from the melt. These are casting methods in which the liquid metallic alloy solidifies to the monocrystalline structure, that is to say to the monocrystalline workpiece, or directionally solidifies.

In this case, dendritic crystals are oriented along the heat flow and form either a columnar-crystalline grain structure (columnar, that is to say grains which run over the entire length of the workpiece and here, according to general linguistic practice, are designated as being directionally solidified) or a monocrystalline structure, that is to say the entire workpiece consists of a single crystal. These methods have to avoid the transition to globulitic (polycrystalline) solidification, since undirected growth necessarily produces transverse and longitudinal grain boundaries which nullify the good properties of the directionally solidified or monocrystalline component.

When directionally solidified structures are referred to in general terms, this means both monocrystals which have no grain
boundaries or, at most, small-angle grain boundaries and columnar-crystal structures which have grain boundaries running in the longitudinal direction, but no transverse grain boundaries. With regard to these second-mentioned crystalline structures, directionally solidified structures are also referred to.

Such methods are known from U.S. Pat. No. 6,024,792 and EP 0 892 090 A1; these publications are part of the disclosure with regard to the solidification method.

The blades 120, 130 may also have coatings against corrosion or oxidation, for example (MCrAlX; M is at least one element of the group iron (Fe), cobalt (Co), nickel (Ni), X is an active element and stands for yttrium (Y) and/or silicon, and/or at least one rare earth element or hafnium (Hf)). Such alloys are known from EP 0 486 489 B1, EP 0 786 017 B1, EP 0 412 397 B1 or EP 1 306 454 A1 which are to be part of this disclosure with regard to the chemical composition of the alloy.

The density preferably lies at 95% of the theoretical density.

A protective aluminum oxide layer (TGO=thermal grown oxide layer) forms on the MCrAlX layer (as an intermediate layer or as the outermost layer).

A heat insulation layer may also be present on the MCrAlX and is preferably the outermost layer and consists, for example, of
$ZrO_2$, $Y_2O_3$—$ZrO_2$, that is to say it is not stabilized or is partially or completely stabilized by yttrium oxide and/or calcium oxide and/or magnesium oxide.

The heat insulation layer covers the entire MCrAlX layer. Columnar grains are generated in the heat insulation layer by means of suitable coating methods, such as, for example, electron beam evaporation (EB-PVD).

Other coating methods may be envisaged, for example atmospheric plasma spraying (APS), LPPS, VPS or CVD. The heat insulation layer may have porous, microcrack- or macrocrack-compatible grains for better thermal shock resistance. The heat insulation layer is therefore preferably more porous than the MCrAlX layer.

Refurbishment means that components 120, 130, after use, must, where appropriate, be freed of protective layers (for example, by sandblasting). A removal of the corrosion and/or oxidation layers or products then takes place. If appropriate, cracks in the component 120, 130 are also repaired. This is followed by a recoating of the component 120, 130 and a renewed use of the component 120, 130.

The blade 120, 130 may be of hollow or solid design. If the blade 120, 130 is to be cooled, it is hollow and, if appropriate, also has film cooling holes 418 (indicated by dashes).

Figure 3:
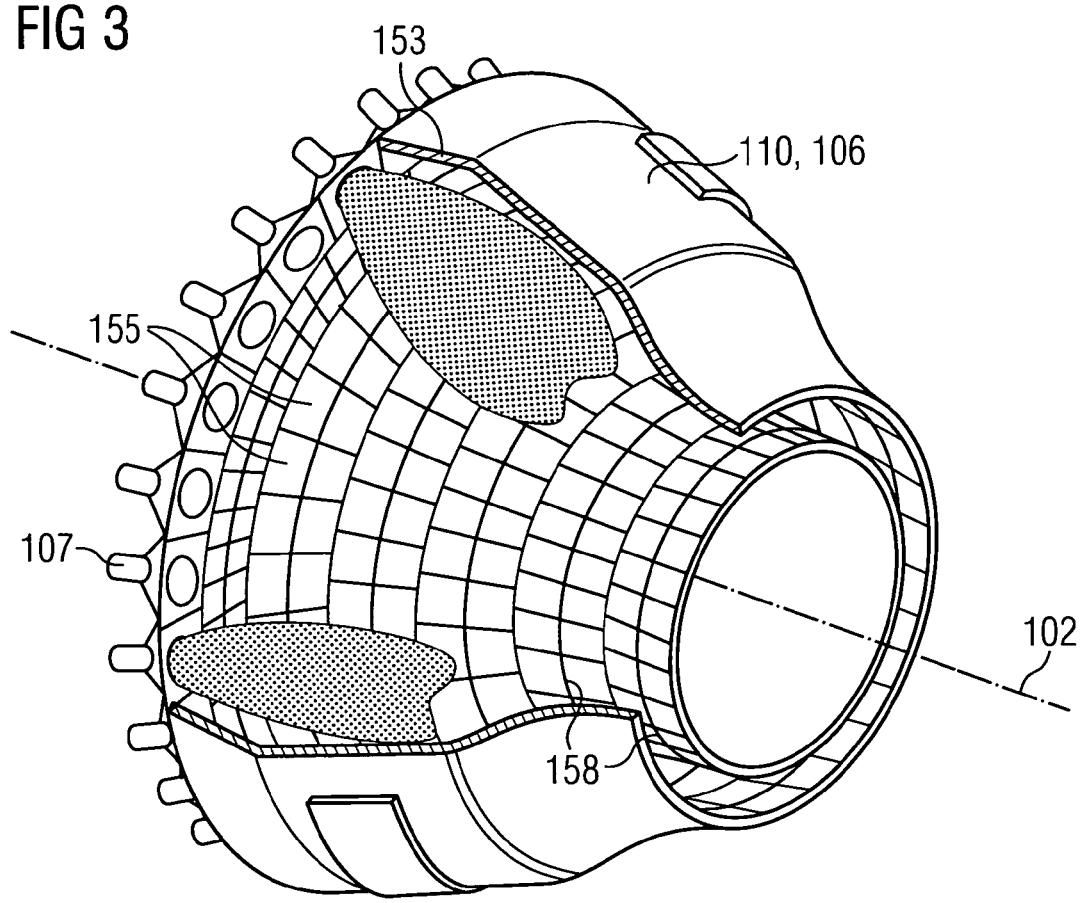
FIG. 3 shows a combustion chamber of a gas turbine.

FIG. 3 shows a combustion chamber 110 of a gas turbine. The combustion chamber 110 is configured, for example, as what is known as an annular combustion chamber, in which a multiplicity of burners 107 arranged around an axis of rotation 102 in the circumferential direction issue into a common combustion chamber space 154 and generate flames 156. For this purpose, the combustion chamber 110 is configured as a whole as an annular structure which is positioned around the axis of rotation 102.

To achieve a comparatively high efficiency, the combustion chamber 110 is designed for a comparatively high temperature of the working medium M of about 1000° C. to 1600° C. In order to make it possible to have a comparatively long operating time even under these operating parameters which are unfavorable for the materials, the combustion chamber wall 153 is provided on its side facing the working medium M with an inner lining formed from heat shield elements 155.

Each heat shield element 155 consisting of an alloy is equipped on the working-medium side with a particularly heat-resistant protective layer (MCrAlX layer and/or ceramic coating) or is manufactured from material resistant to high temperature (solid ceramic rocks).

These protective layers may be similar to those of the turbine blades, that is to say, for example, MCrAlX means: M is at least one element of the group iron (Fe), cobalt (Co), nickel (Ni), X is an active element and stands for yttrium (Y) and/or silicon, and/or at least one rare earth element or hafnium (Hf). Such alloys are known from EP 0 486 489 B1, EP 0 786 017 B1, EP 0 412 397 B1 or EP 1 306 454 A1 which are to be part of this disclosure with regard to the chemical composition of the alloy.

A, for example, ceramic heat insulation layer may also be present on the MCrAlX and consists, for example, of $ZrO_2$, $Y_2O_3$—$ZrO_2$, that is to say it is not stabilized or is partially or completely stabilized by yttrium oxide and/or calcium oxide and/or magnesium oxide.

Columnar grains are generated in the heat insulation layer by means of suitable coating methods, such as, for example, electron beam evaporation (EB-PVD).

Other coating methods may be envisaged, for example atmospheric plasma spraying (APS), LPPS, VPS or CVD.

The heat insulation layer may have porous, microcrack- or macrocrack-compatible grains for better thermal shock resistance.

Refurbishment means that heat shield elements 155, after being used, must, where appropriate, be freed of protective layers (for example, by sandblasting). A removal of the corrosion and/or oxidation layers or products then takes place. If appropriate, cracks in the heat shield element 155 are also repaired. A recoating of the heat shield elements 155 and a renewed use of the heat shield elements 155 then follow.

Moreover, on account of the high temperatures inside the combustion chamber 110, a cooling system may be provided for the heat shield elements 155 or for their holding elements. The heat shield elements 155 are then, for example, hollow and, if appropriate, also have cooling holes (not illustrated) issuing into the combustion chamber space 154.

An exemplary embodiment of the device according to the invention for peening a component is illustrated diagrammatically in FIG. 4 in a sectional side view. The peening device 1 is configured as a shot peening device for shot peening the blade feet of turbine blades 2. It comprises a vacuum chamber 5 in which pressure can be reduced with respect to the ambient pressure by means of a connected vacuum pump 7. In the chamber bottom 9 of the vacuum chamber 5, orifices are present, through which the blade leaves 3 of the turbine blades 2 can be inserted, so that they project out of the vacuum chamber 5.

Figure 6:
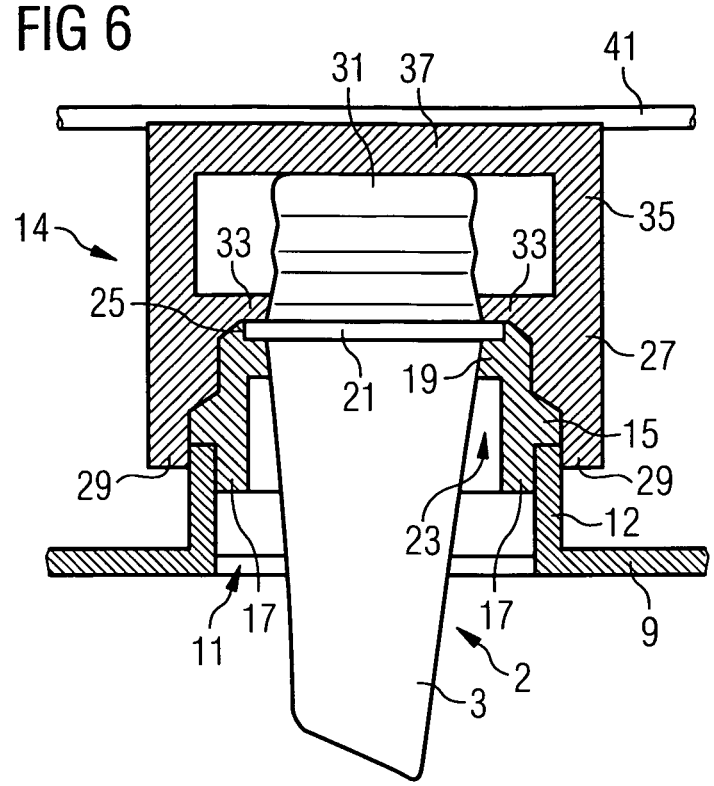
FIG. 6 shows the detail from FIG. 5 in a section perpendicular to the section from FIG. 5.

An orifice 11 in the chamber bottom 9 and a turbine blade 2, the blade leaf 3 of which is inserted through the orifice 11, are shown in a sectional view in FIG. 5. A sectional view, perpendicular to the section from FIG. 5, of the same turbine blade 2 and of the same orifice 11 is shown in FIG. 6.

The orifice 11 is surrounded by a wall 13 which projects toward the inside of the vacuum chamber 5 and which forms a nipple-like element 12 around the orifice 11. A mounting 14 with a turbine blade 2 is inserted into the orifice 11a of the nipple 12. The mounting comprises two parts, to be precise an inner element 15 and an outer element 27. The inner element 15 is inserted into the orifice 11a of the nipple 12. For this purpose, a portion 17 of the inner element 15 has an external dimension which corresponds to the internal dimension of the nipple 12, so that the inner element 15 can be inserted with an exact fit into the orifice 11a. Furthermore, the inner element 15 has a bearing portion 19 on which the blade platform 21 of the turbine blade 2 can lie. Located at the center of the bearing portion 19 is a leadthrough orifice 23 through which the blade leaf 3 can be led through the inner element 15 of the mounting 14.

The inner element 15 is in this case configured in such a way that it completely surrounds the edge 25 of the blade platform 21, that side of the blade platform 21 which faces the blade leaf 3 and a portion, adjacent to the blade platform 21, of the blade leaf 3. In particular, the dimensions of the bearing portion 19 and of the leadthrough orifice 23 may be designed such that they form an exactly fitting bearing surface or leadthrough for the turbine blade 2.

The inner element 15 and consequently the turbine blade 2 are secured by means of the outer element 27 which is slipped over the inner element 15 and which has a portion which comes to bear against the outside of the wall 13. The portion 29 is in this case configured in such a way that it bears closely against the outside of the wall 13. Moreover, a tension device may preferably be present, by means of which the inner element 15 and the outer element 27 can be braced with respect to one another in such a way that the mounting 14 is secured with a clamping fit on the nipple 12 in the region of the orifice 11a.

The outer element 27 does not reach as far as the blade foot 31 on the wide side of the blade 2 (cf. FIG. 5). Only on the narrow sides of the blade 2 are located holding portions 33 which reach up to the blade foot 31 and which engage from above onto the blade platform 33 and thus fix the blade platform 21 on the bearing portion 19 of the inner element 16.

Moreover, the outer element 27 has a stirrup 35 having an upper part 37 which bears with an exact fit against the top side of the blade foot 31 when the outer element 27 is placed onto an inner element 15 having a blade 2 arranged in it. The upper part 37 of the stirrup 35 forms a cap which seals off inlet orifices for cooling air into internal cooling air ducts of the turbine blade 2 against the penetration of peening product 4. So that the blade foot 31 remains accessible to the peening product everywhere, the stirrup 35 is configured such that, except on the top side of the blade foot 31, it runs at a distance from the blade foot 31 when a turbine blade 2 is held by the mounting 14.

On account of the nipple 12 and the overall height of the mounting 14, the blade foot 31 of a turbine blade 2 is at a sufficient distance from the chamber bottom 9, so that it is also possible to peen the blade foot from a direction inclined with respect to the chamber bottom. As a result, for example, curved portions 32 of turbine blades 2 can be peened with peening product 4 such that the peening product 4 can impinge onto all the surface regions essentially perpendicularly.

The mounting 14 is configured with as few horizontal surfaces as possible, so that the peening product 4 can run off, unimpeded, from the mounting in the direction of the chamber bottom 9. Peening product deposits can thus be largely avoided.

During a peening process, the orifice 11 is closed completely by the mounting 14 and the turbine blade 2 arranged in it, so that the blade leaf 3 projecting out of the vacuum chamber 5 is not accessible for the peening product 4. Those portions of the blade leaf 3 which are surrounded completely by the mounting 14 are protected by the latter against peening product. The same applies to the blade platform.

The introduction of a turbine blade 2 into the vacuum chamber 5 may take place in that the upper part 39 of the vacuum chamber 5 is removed. All the chamber orifices 11 thereby become accessible. Then, first, the inner element 15 of the mounting 14 is placed onto the nipple 12. The turbine blade 2 is then led with the blade leaf 3 through the passage orifice 23 of the inner element 15, so that the blade platform 21 comes to bear on the bearing portion 19. The outer element 27 is subsequently put in place and is braced against the inner element 15 in order to ensure a secure hold of the turbine blade 2.

With the outer element 27 put in place, the top side of the blade foot 31 is then protected by the upper part 37 of the stirrup portion 35 of the outer element 27. Moreover, the upper part 37 of the stirrup portion may have tenons which engage into the cooling air inlet orifices in the blade foot 31.

The bracing of the outer element 27 against the inner element 15 may take place, for example, by means of screw or snap connections. It is also possible, however, to press the outer element 27 onto the inner element 15 from above, this purpose being served by a rod 41 which can engage into a notch 43 formed in the upper part 37. By pressure on the rod 41, the outer element 27 can be pressed firmly onto the inner element 15.

Figure 7:
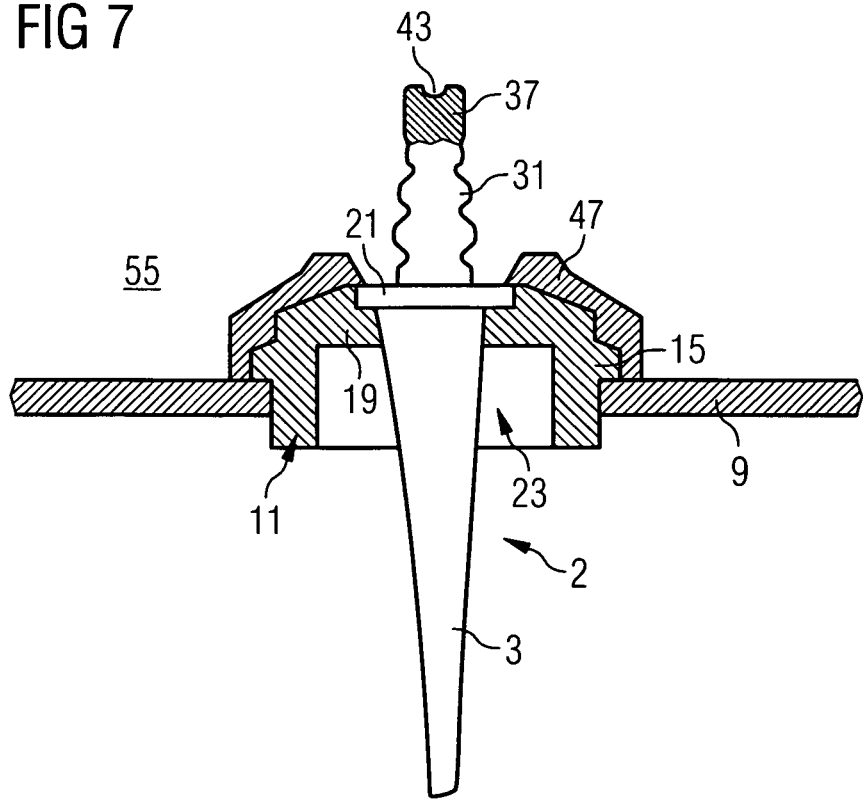
FIG. 7 shows a modification of the detail shown in FIG. 5.

A modification of the exemplary embodiment of the peening device described with reference to FIGS. 5 and 6 is illustrated in FIG. 7. The sectional view shown in FIG. 7 corresponds to the sectional view from FIG. 5. The vacuum chamber 55 differs from the vacuum chamber 5 of the first design variant in that the orifice 11 in the chamber bottom 9 is not surrounded by a nipple 12. In this embodiment, the inner element 15 is inserted directly into the orifice 11. By means of an outer element 47 which corresponds essentially to the outer element 37 of the first design variant, the inner element 15, together with a turbine blade 2 inserted in it, is secured. The outer element 47 differs from the outer element 37 merely in that the portion 29 coming to bear against the outside of the nipple 12 is absent. Instead, the outer element 47 is pressed directly onto the chamber bottom 9, for example, by means of the rod 41.

In the design variant described, the distance of the blade foot 31 from the chamber bottom 9 is markedly shorter than in the first variant. However, depending on the design of the blade foot 31 and on the peening process used, this shorter distance may also be sufficient to be able to peen, in particular shot peen, the blade foot 31. The design variant illustrated in FIG. 7 otherwise does not differ from the design variant illustrated in FIGS. 5 and 6.

It may be noted at this juncture that, contrary to what is illustrated in the exemplary embodiment, the orifice 11 may basically also be arranged in a side wall or in the ceiling of the vacuum chamber. The advantage of arranging the orifice in the chamber bottom, however, is that the insertion of the turbine blade 2 into the mounting is simpler than in the other variants, since even the force of gravity leads to the blade being fixed in position after the latter has been inserted into the inner element, whereas, in the other variants, measures have to be taken in order to fix the blade 2 until the outer element of the mounting has assumed fixing.

The invention claimed is:

1. A peening device for peening a turbine blade which has a blade leaf, a blade foot and a blade platform arranged between the blade leaf and blade foot, a part of the turbine blade which is to be peened being formed by that side of the blade platform which faces the blade foot, and a part of the turbine blade which is not to be peened being formed by the blade leaf and by that side of the blade platform which does not face the blade foot, comprising:
    a chamber with at least one orifice arranged in the chamber, the orifice dimensioned such that at least a part of the blade leaf is led at least partially through the orifice, wherein the orifice is surrounded by a nipple projecting toward a chamber interior; and
    a mounting that holds the turbine blade in place with respect to the nipple and with the blade foot inside the chamber, the mounting having a portion which, when that part of the turbine blade which is not to be peened is led at least partially through, completely covers the orifice in the chamber and completely surrounds that part of the turbine blade which is not to be peened between a region of the turbine blade which is adjacent to that part of the turbine blade which is to be peened and the orifice, the mounting configured such that the mounting completely surrounds an edge of the blade platform.

2. The peening device as claimed in claim 1, wherein the chamber has a chamber bottom in which the at least one orifice is arranged.

3. The peening device as claimed in claim 1, wherein the mounting has a region on which a side of the blade platform which faces the blade leaf lies when the turbine blade is held.

4. The peening device as claimed in claim 3, wherein a cap is additionally present, which is designed to be placed onto an end of the blade foot which faces away from the blade leaf.

5. The peening device as claimed in claim 4, wherein the cap is connected to the mounting such that, with the turbine blade held by the mounting, the connection is located at a distance from the blade foot in the region of the narrow sides of the blade foot.

6. The peening device as claimed in claim 5, wherein the mounting has discharge surfaces and/or discharge ducts for discharging a peening product.

7. The peening device as claimed in claim 1, wherein the chamber is a vacuum chamber.

8. The peening device as claimed in claim 1, wherein the peening device strain hardens a turbine blade.

9. A peening device for peening a foot of a turbine blade comprising a blade leaf, the blade foot and a blade platform arranged between the blade leaf and the blade foot, comprising:
    a chamber comprising at least one orifice dimensioned to receive at least part of the blade leaf, the chamber further comprising a nipple surrounding the orifice and projecting toward a chamber interior; and
    a discrete mounting component associated with the nipple and configured to receive at least the blade leaf, the mounting component comprising a portion which, when the mounting component has received at least the blade leaf, completely covers the orifice in the chamber and completely surrounds an edge of the blade platform, a side of the blade platform adjacent the blade leaf, and a portion of the blade leaf adjacent the blade platform, and positions the blade foot inside the chamber.

10. The peening device of claim 9, wherein the nipple comprises an outer diameter that is equal to an inner diameter of the at least one orifice.

11. The peening device of claim 9, wherein a portion of the mounting component fits inside the nipple.

* * * * *